March 18, 1958 L. OCHTMAN 2,826,937
ACTUATOR MECHANICAL CONTROL SYSTEM
Filed Nov. 9, 1953 7 Sheets-Sheet 1

INVENTOR.
LEONARD OCHTMAN
BY

ATTORNEY

March 18, 1958     L. OCHTMAN     2,826,937
ACTUATOR MECHANICAL CONTROL SYSTEM
Filed Nov. 9, 1953     7 Sheets-Sheet 2

INVENTOR.
LEONARD OCHTMAN
BY
ATTORNEY

March 18, 1958 L. OCHTMAN 2,826,937
ACTUATOR MECHANICAL CONTROL SYSTEM
Filed Nov. 9, 1953 7 Sheets-Sheet 3

INVENTOR.
LEONARD OCHTMAN
BY
ATTORNEY

March 18, 1958     L. OCHTMAN     2,826,937
ACTUATOR MECHANICAL CONTROL SYSTEM
Filed Nov. 9, 1953     7 Sheets-Sheet 5

INVENTOR.
LEONARD OCHTMAN
BY

ATTORNEY

March 18, 1958 L. OCHTMAN 2,826,937
ACTUATOR MECHANICAL CONTROL SYSTEM
Filed Nov. 9, 1953 7 Sheets-Sheet 6

INVENTOR.
LEONARD OCHTMAN
BY *Nicholas J. Garfolo*

ATTORNEY

March 18, 1958  L. OCHTMAN  2,826,937
ACTUATOR MECHANICAL CONTROL SYSTEM
Filed Nov. 9, 1953  7 Sheets-Sheet 7

INVENTOR.
LEONARD OCHTMAN
BY
ATTORNEY

United States Patent Office 2,826,937
Patented Mar. 18, 1958

2,826,937
ACTUATOR MECHANICAL CONTROL SYSTEM

Leonard Ochtman, Ridgewood, N. J., assignor to Bendix Aviation Corporation, Teterboro, N. J., a corporation of Delaware Application November 9, 1953, Serial No. 390,838

8 Claims. (Cl. 74—768)

This invention pertains to a power operated system that is particularly useful in controlling the movements of aircraft control surfaces, such as ailerons, rudders, elevators, and the like.

In aircraft, particularly those of the high performance type, the power required for control surface movement is considerably greater than that attainable by manual effort alone exercised through the pilot's control stick. An object of the invention is, therefore, to provide power for actuating a control surface of a plane through the pilot's stick in a practical and efficient manner.

In general, this is accomplished in the present invention by a power operated reversing drive mechanism adapted for connection to a control surface of an aircraft and subject to stick control.

A feature of the invention is certain braking mechanism which controls the functions of the reversing drive system and which is subject to pilot stick control with minimum effort on the part of the pilot.

Another feature of the invention is a follow-up mechanism associating the output of the reversing drive mechanism with the braking mechanism whereby time lag between pilot stick operation and surface control movement is substantially eliminated.

Another object of the invention is to provide power for actuating a control surface of a plane through the pilot's stick in such manner as to require a minimum of effort on the part of the pilot.

A further object of the invention is to provide power for actuating a control surface of a plane through the pilot's stick in such manner that control surface movement responds to stick movement without appreciable time lag.

A more particular object of the invention is to provide practical and efficient controls over a power operated reversing drive mechanism so as to selectively control its functions.

A further particular object of the invention is to provide follower controls over a power operated reversing drive mechanism.

The invention further lies in the particular organization of the various elements of the system and in their cooperative association with one another to produce the beneficial results intended.

The foregoing and other objects and advantages of the invention will appear more fully hereinafter from a consideration of the detailed description which follows, taken together with the accompanying drawings, wherein one embodiment of the invention is illustrated. It is to be expressly understood, however, that the drawings are for the purposes of illustration and description, and are not to be construed as defining the limits of the invention.

In the drawings, wherein a power operated control system embodying the invention is illustrated:

In describing the invention in further detail, reference is directed to the drawings, wherein there is disclosed a power operated system for operating an aircraft control surface device and controllable as to its result by means of the pilot's stick.

Figure 1:
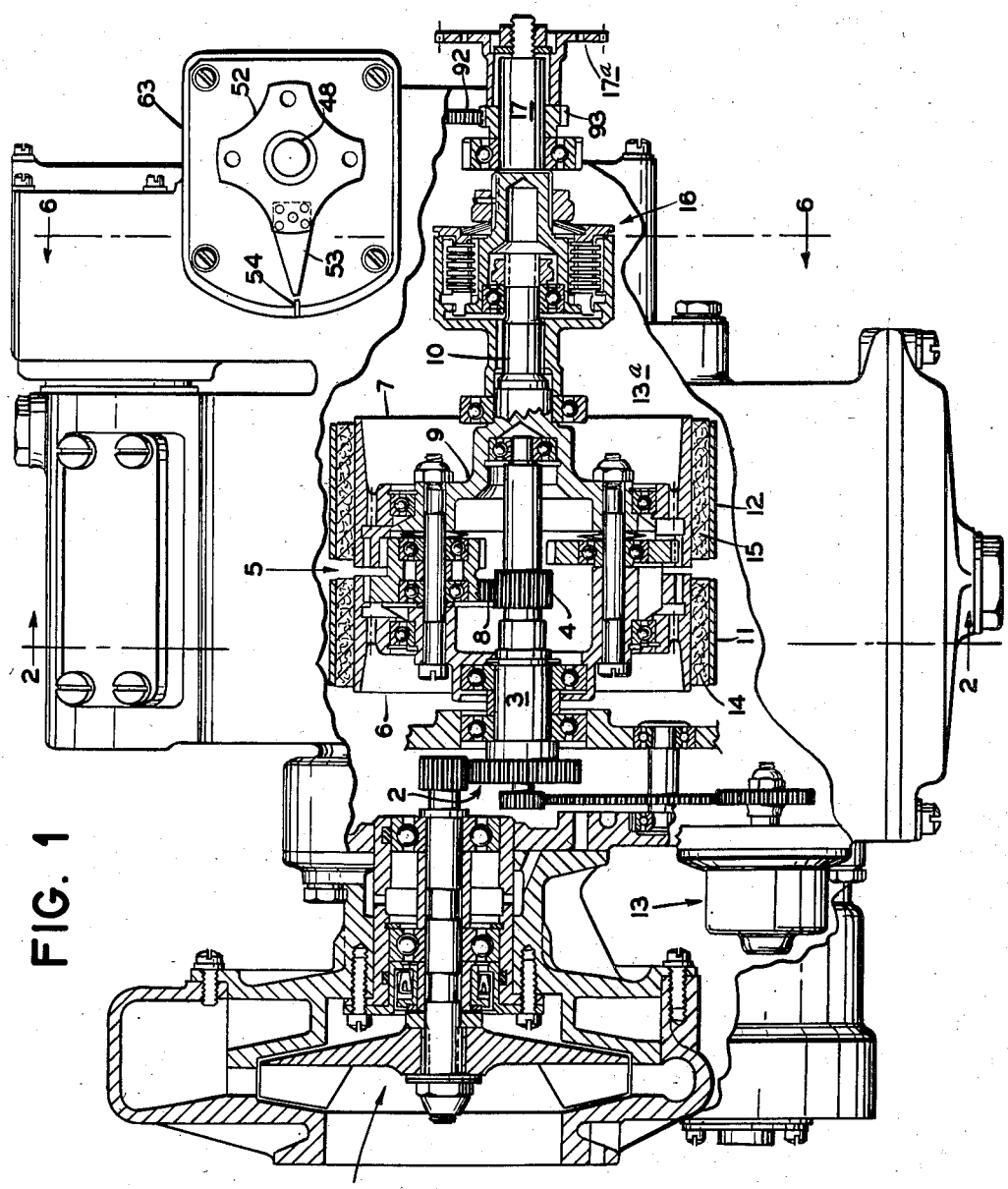
Fig. 1 is a longitudinal section through the power portion of the unit.

(Fig. 1) The system derives its power from a continuously rotating air-driven turbine system, generally designated 1, which, through suitable gearing 2, continuously drives an input shaft 3. The latter carries a sun gear 4 geared to the planetary gear reversing drive system 5. This reversing drive is essentially disclosed in my U. S. Patent No. 2,682,789. The latter system includes a pair of cylindrical drums 6 and 7, both internally geared through planetary gearing 8 to the sun gear and an associated cage 9 carrying a shaft 10. The cylindrical drums 6 and 7 are orbit gears of the planetary system. Surrounding the drums are brake bands 11 and 12 adapted to respectively clamp brake shoes 14 and 15 against the peripheral surfaces of the drums. Planetary gears 8 are the left part of dual gear pinions. The right part of the pinions is a smaller gear. One of these dual pinions is shown. The smaller gears of the pinions mesh with two angularly offset gears (one of which is shown). The two angularly-offset gears also mesh with the orbit gearing of drum as shown at the left bottom part of drum 7. Assuming for the moment that brake band 11 is tightened so as to prevent rotation of orbit gear 6, clockwise rotation (as seen from the left) of pinion 4 will cause gear 8 to rotate in a counterclockwise direction so as to revolve in a clockwise direction inside the stationary orbit gear 6, which may be considered a fulcrum gear, thereby rotating cage 9 in a clockwise sense. Simultaneously with tightening brake band 11, brake band 12 is loosened proportionally in a manner which will hereinafter be described in detail. The angularly offset gears will be rotated by the small gears of the dual gears in a clockwise sense and will drive internal gear 7 clockwise but, as the brake shoes are completely released from drum 7, gear 7 will merely idle and will have no effect on the operation of the drive.

If brake band 12 is tightened to lock internal gear 7 relative to the housing and brake band 11 is loosened to free orbit gear 6, rotation of pinion 4 will be transmitted to the output shaft as follows:

Pinion 4 will rotate the dual gears including gear 8 counterclockwise and the angularly offset gears will be rotated in a clockwise direction. As the orbit gear 6 is free to rotate it will have no effect on the operation but will idle in a counter-clockwise direction. Since the angularly offset gears are in mesh with the now stationary internal gear 7 which now acts as a fulcrum gear, the cage and the output shaft will rotate in a counter-clockwise direction or in the direction oppositely to that in which it was rotated when orbit gear 6 was locked and internal gear 7 was free. It is obvious that as brake band 11 is gradually loosened while brake band 12 is gradually tightened, orbit gear 6 will begin to slip as internal gear 7 is retarded until the rotational speed of these gears is equal at which time the output shaft will be stationary. The arrangement of the planetary system about the continuously rotating sun gear 4, thus, is such that, when the drum 6 is braked and is prevented from rotating, the planetary gearing operates to drive the cage 9 and shaft 10 thereof in a clockwise direction; when the drum 7 is braked and is prevented from rotating, the planetary gearing operates to drive the cage 9 and shaft 10 in a counterclockwise direction; and when a brake drag is equally applied against both drums so as to retard the rotational speed of the one against the other, the cage 9 and shaft 10 will be stationary. In this last case, it can be seen that a slight unbalancing of braking action against the respective drums will cause the shaft 10 to rotate slowly in a direction depending on which drum received the greater braking action. This reversing drive system and its resulting action is utilized in providing a powered control of an aircraft surface control element through the pilot's stick with minimum effort on the part of the pilot, and is also utilized to provide a prompt control surface movement without appreciable time lag in response to stick movement. The reversing drive system is similar to, and performs the same function as that disclosed in my pending U. S. application, filed August 23, 1949, for a Reversing Drive, and bearing Serial No. 111,915 now Patent No. 2,682,789.

A suitable oil pump, generally designated 13, operable through gearing engaged with the continuously turbine driven shaft 3, serves in suitable manner to pump lubricating oil to various parts of the system.

The shaft 10 of cage 9 is connected through a conventional slip clutch 16 to an output shaft 17. The latter is adapted, such as by a flange gear element 17a thereon, for connection to a control surface element, not shown, which we will here assume to be an aircraft aileron, though it may be a rudder, an elevator, or the like. Controlled clockwise and counterclockwise movements of the output shaft 17 are provided herein to position without appreciable time lag the control surface about its support and to restore it to neutral position. To this end, suitable controls are provided over the braking mechanism in driving the output shaft to position the control surface. Other controls are provided to bring about a prompt response of the control surface to these controls. Suitable braking control mechanism is provided to brake each of the drums selectively in order to cause the drive shaft 17 to be driven in one direction or the other as desired, or to balance the braking action on the drums so as to hold the output shaft 17 stationary when necessary.

In the drawings, particularly Figs. 2–5, brake drum 6 shown in broken line is disclosed with its direction of rotation indicated by the arrow. The brake band 11 about drum 6 has secured at the right end, the end where drum rotation enters beneath the band, an eye 18 to which is pivoted at 19 a force lever 21 pivoted on a cross shaft 22 which is carried fast at its ends in right and left walls of an upper portion 23 (Fig. 5) of the housing. The other end of the band has an eye 24 to which is pivoted at 25 the lower half 26 of a two piece lever, the upper half 27 of which lever is pivoted at 28 in an upper bifurcated portion of the lower half. The upper lever part 27 is provided with a foot 29 which limits upon a spring 31 extending out of the base of the bifurcated lever 26. The spring serves to tension the two piece lever in a counterclockwise direction, in which direction it is limited by an adjusting screw 32 of the upper member 27 limiting against a button 33 on a projection of the lower member 26. The upper lever part 27 is pivoted by a pin 34 in a bifurcated end of a link 35, which link also has a bifurcation at its other end in which the upper end of the force lever 21 is pivoted by a pin 36. The latter pin is elongated and projects from opposite sides of the link 35. The force lever is tensioned or held in its normal position by a canterlever spring 37, one end is fixed in a side of the force lever and the free end of which is limited against the underside of the head of a set screw 38 that is carried in an upper supporting block element 39 of the housing.

Now, when a lifting force is exerted on the extended pin 36 of the force lever, the latter is pivoted on rod 22 against the tension of the spring 37, whereupon the eyes 18 and 24 are both forced through the associated linkage to move in a clockwise direction so as to exert through the brake band a braking action against the related drum. Due to lever proportions, eye 24 will move further than eye 18 and a tightening action will result. When the lift force is removed from the lever 21, the latter is restored by its spring 37. An adjustable stop screw 41 carried by the supporting block element 39 serves as a stop to limit the lever in a neutral position under tension of the canterlever spring 37. A drag upon the drum may be provided by adjustments of the two piece lever screw 32 to the extent that only a slight lifting force on the force lever will be required to brake the drum and cause the output shaft to rotate in a clockwise direction.

Figure 3:
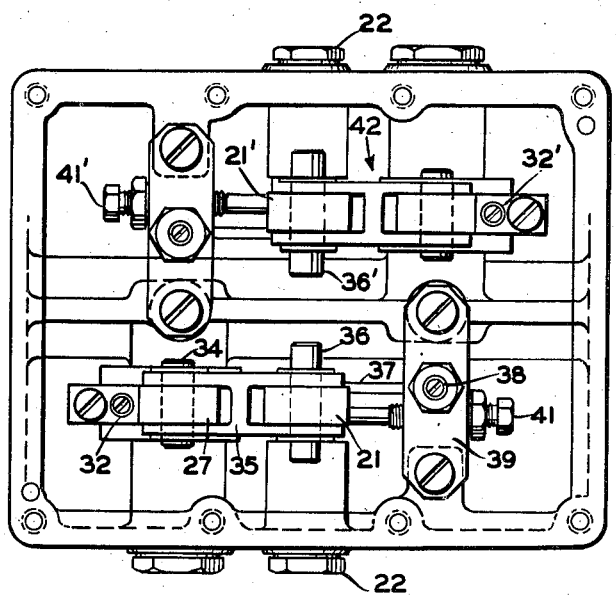
Fig. 3 is a top plan section on the line 3—3 of Fig. 2.
Figure 4:
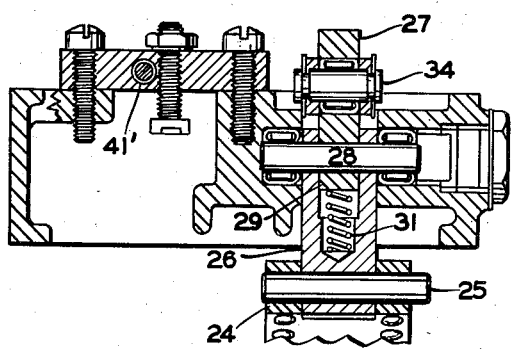
Fig. 4 is a fragmentary vertical section on the line 4—4 of Fig. 2.

The braking mechanism, generally designated 42 in Fig. 3, with respect to the drum 7, is identical to that described with respect to drum 6 as above, and the shaft 22 which supports the force lever 21 of the braking mechanism of drum 6 also supports a similar force lever 21' related to the braking mechanism of drum 7. The braking mechanisms, as indicated in Fig. 3, are positioned side by side, that related to drum 7 is, however, positioned in reverse inasmuch as the drum which it controls rotates in a counterclockwise or reverse direction to that of drum 6.

Figure 2:
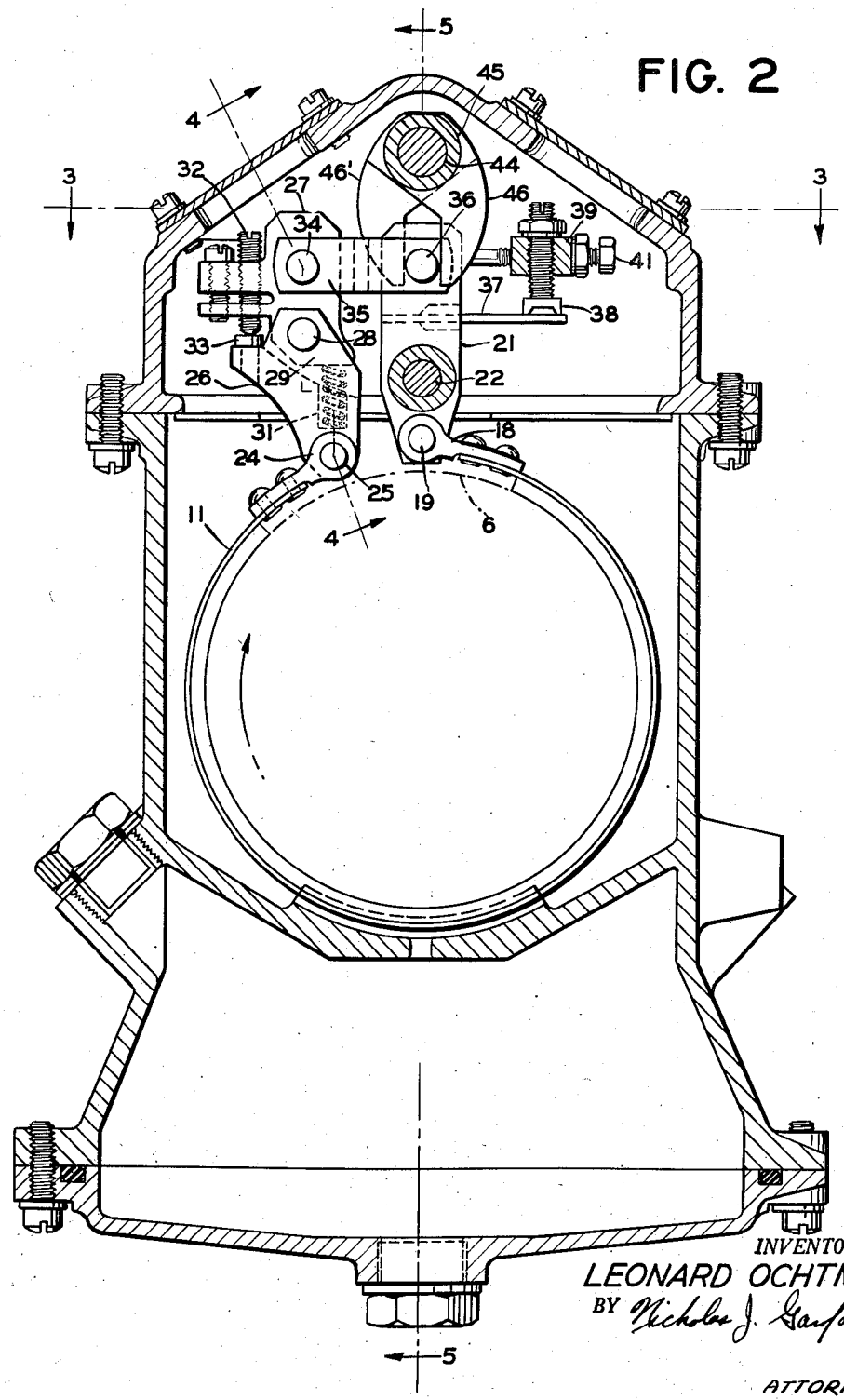
Fig. 2 is a cross section on the line 2—2 of Fig. 1, directed to the drum brake controls.
Figure 5:
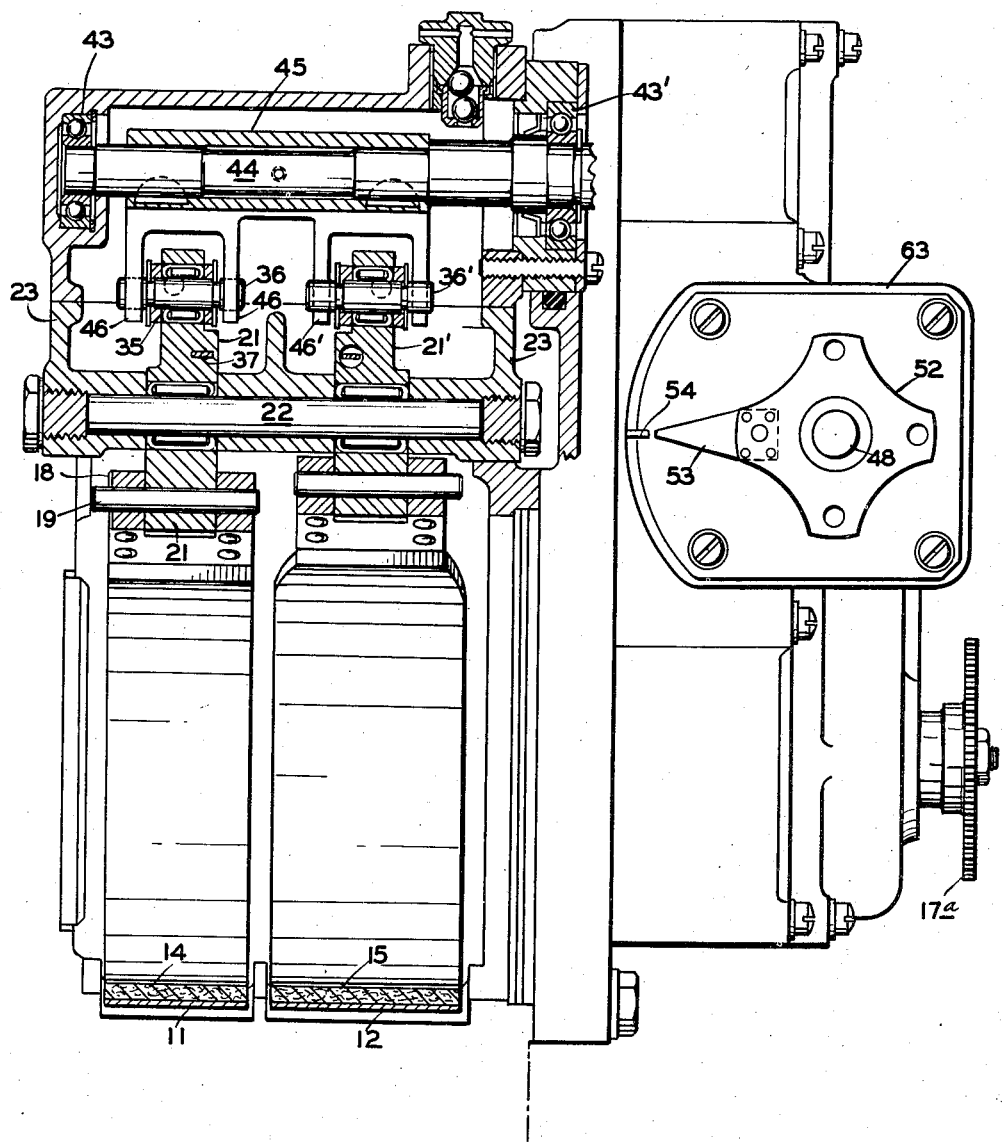
Fig. 5 is a vertical section on the line 5—5 of Fig. 2.
Figure 7:
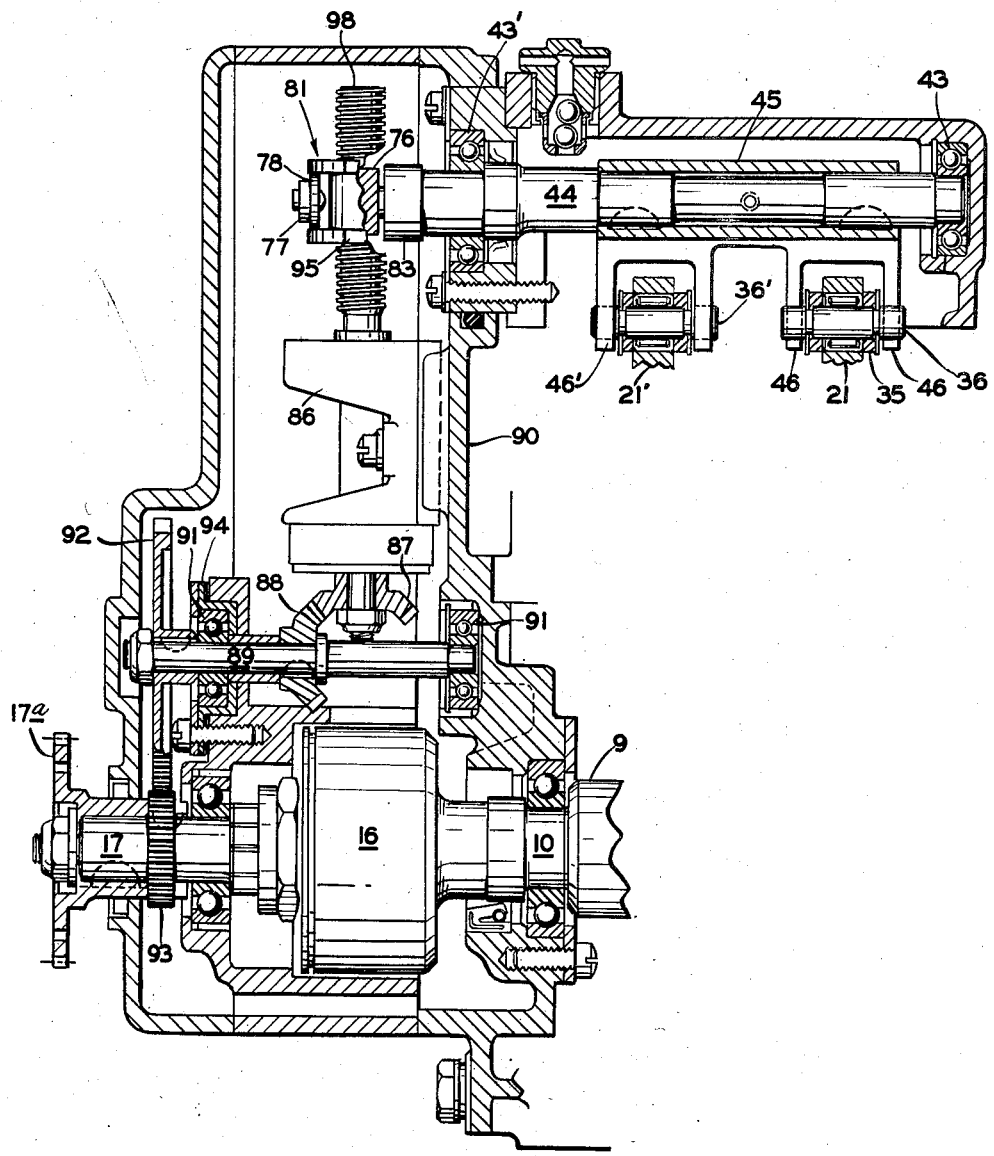
Fig. 7 is a view from the right of Fig. 6.

Extending transversely above the force levers of both braking mechanisms and carried in suitable bearings 43 and 43' in opposite portions of the housing is a brake operating shaft 44 having secured thereon a lever 45 (Figs. 2, 5, 7). The latter includes a pair of spaced arcuate arms 46, the tail ends of which limit on the same side, one against each end of the elongated pin 36 of the force lever 21 of drum 6. The brake shaft lever is provided with another and similar pair of arms 46' but oppositely positioned, which limit in similar manner against the elongated pin 36' of the force lever of drum 7. The arrangement is such, that clockwise rotation of the shaft 44 in Fig. 2 will bring the tail ends of the arms 46 to press a lifting force against the pin 36 of force lever 21, and will move the other arms 46' away from the pin 36' of the related force lever 21'.

The position of the pins 36 and 36' are adjustable relative to the tail ends of their respective arms by means of the stop screws 41 and 41', controlling the position of the related force levers, so that the arms will just contact their respective pin without any free play between them. It can be seen, that clockwise rotation of the operating shaft 44 will brake drum 6, and counterclockwise rotation of the shaft will brake drum 7.

So as to minimize the extent of the lift force required to brake the drums, the two piece lever adjusting screws 32 and 32' are set so that there will be a balancing initial drag on each drum, whereby this drag the output shaft 17 will normally be held stationary and only a slight braking action on either drum will be required to rotate the shaft in either direction.

Figure 9:
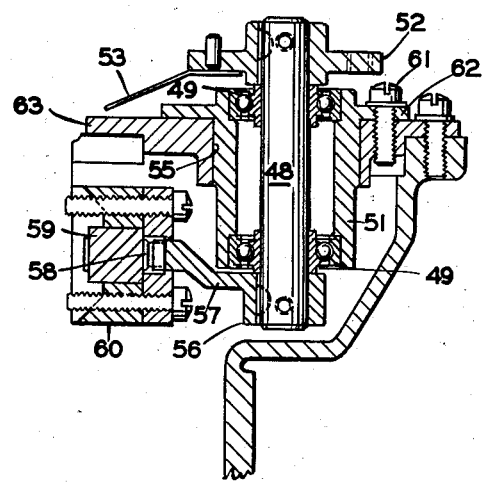
Fig. 9 is a section on the line 9—9 of Fig. 6 revolved.
Figure 10:
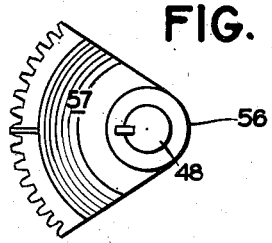
Fig. 10 is a detail of the sector element.

Follow-up controls are provided so that, when the output shaft has been actuated to move a control surface, it will be caused to stop when the control surface has been moved to its desired position. Other controls are provided to determine the extent to which the control surface is to move. To this end, there is provided a control shaft 48 (Fig. 9) carried in suitable bearings 49 in a carrier element 51. The latter is supported in the pilot 55 of a plate 63 mounted on the housing. Fixed to the upper end of shaft 48 is a flange 52 adapted for connection to the pilot's stick, not shown. Secured to the flange is a pointer 53 adapted to sweep over a neutral mark position 54 indicated on supporting plate 63. At the opposite end of the control shaft is keyed the knee end 56 of a sector element 57. The latter engages with a rack 58 of an elongated bar 59. The latter is reciprocable, according to the movement of the sector in a fixed supporting guide element 60. The carrier 51 of the control shaft is mounted by a screw 61 and a flange 62 thereof to the plate 63. The pilot 55 of the carrier 63 and flange 62 are made slightly eccentric with respect to the control shaft bearings 49 for close adjustment of fit between the sector 57 and rack 58 by rotation of the carrier 51 in the support 63. The rack bar 59 (Fig. 6) is limited in the extent of its reciprocable movements by suitable stop means carried on a reduced portion 64 at the lower end of the bar. The stop means includes an upper washer 65 that limits against a shoulder 66 of the bar, and also includes a lower washer 67 spaced from washer 65 by a spring 68 and a spacer 69. The bar 59 is limited in its upward movement by the washer 65 limiting against the base of the guide and the upper end of the spacing element 69. It is limited in its downward direction by the washer 67 limiting against the spacer and a shoulder 71 about a boss hole 72 into which hole the lower end of the bar descends. The stop means is retained upon the bar by a nut 73. It is plain that the bar 59 will be elevated up or down by the sector 57 according to the extent of directional movement of the pointer 53 from neutral position.

Figure 6:
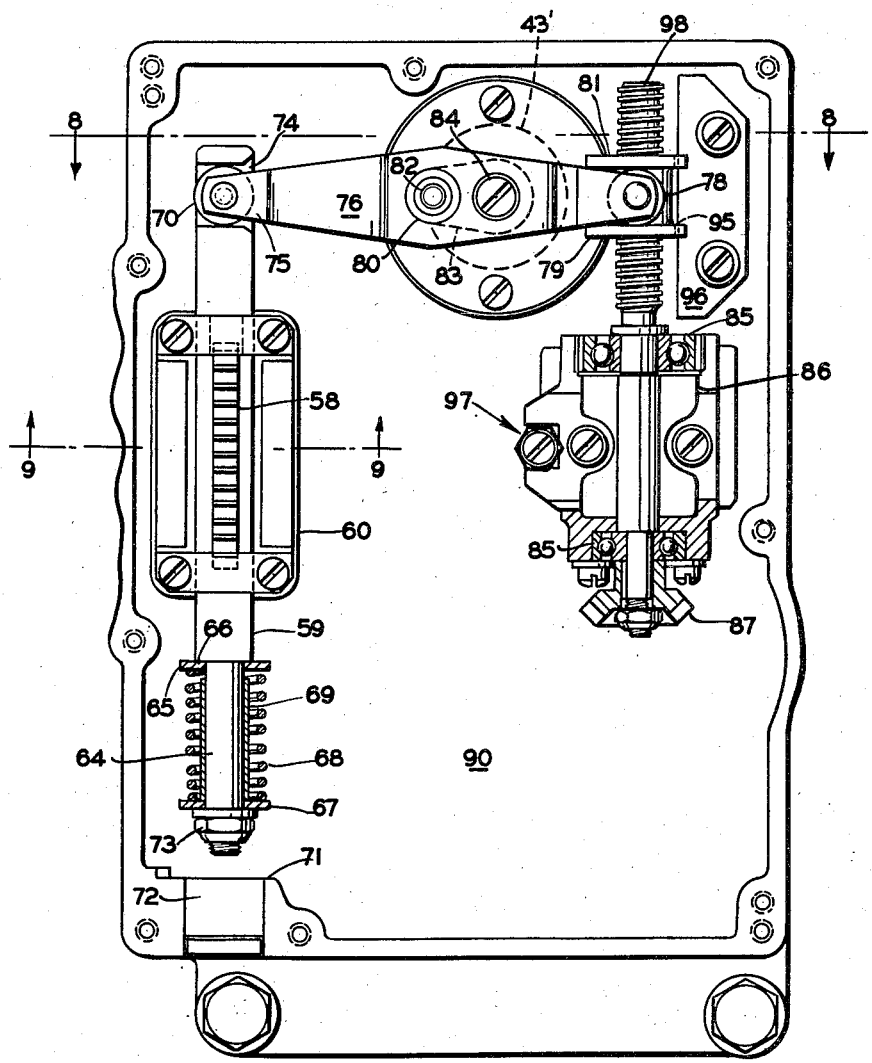
Fig. 6 is a cross section on the line 6—6 of Fig. 1, directed primarily to the follow-up controls.
Figure 8:
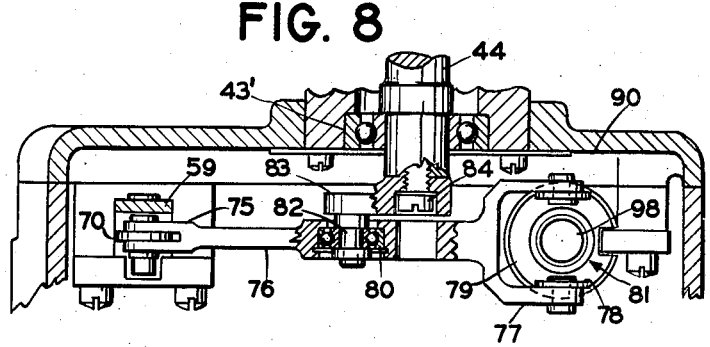
Fig. 8 is a plan view on the line 8—8 of Fig. 6.

Retained in a notch 74 of the upper side face of rack bar 59 is a disc 70 pivoted in a bifurcated end 75 of a double ended lever 76 (Figs. 6 and 8). The other end of the latter lever carries a wide bifurcation, to the inner face of each arm 77 of which bifurcation is pivoted a disc 78 retained between the flanges 79 of a spool 81. Midway of the double ended lever there is journaled in a bearing 80 the crank end 82 of a crank lever 83. The other end of lever 83 is secured fast at 84 to the end of the brake operating shaft 44. It can be seen (Figs. 5, 6 and 8) that when the rack bar 59 is elevated by means of the sector 57, the crank 83 will be turned to rotate the brake shaft 44 clockwise to brake drum 6, and when the rack bar is lowered by the sector, the crank 83 will rotate the brake shaft 44 counterclockwise to brake drum 7. When the double ended lever 76 is raised or lowered by the bar 59, the spool 81 acts as a fulcrum for it.

Now, assuming it is desired to move an aileron from its neutral position to an elevated position, the pilot through the movements of his stick will actuate through the pointer flange 52 the control shaft 48 to both move the pointer 53 from its neutral position and move the sector. This action will raise the rack bar by means of the sector element a distance relative to the movement of the control shaft. The moved position of the pointer with respect to neutral point 54 will indicate the rack bar to have been moved and in which direction it was moved.

Elevating the rack bar will, through the crank lever 83 and brake shaft 44, brake the drum 6 and cause the output shaft 17 to rotate in a clockwise direction to move the associated control surface in the direction desired.

A follow-up mechanism (Figs. 6, 7 and 8) is provided to stop the rotation of the output shaft 17 as the control surface element reaches its intended position. This mechanism includes a spindle or screw 98 on which the spool element 81 is threaded. The lower portion of the screw is journaled for rotatable movement in bearings 85 carried by a supporting block 86 secured to a wall 90 of the housing. The lower end of the screw projects from the supporting block 86 and carries a beveled gear 87 which engages with complementary gearing 88 of a stub shaft 89. The latter shaft is journaled in housing bearings 91 and is secured to a large gear 92 which meshes with a gear 93 carried by the output shaft 17. Means generally indicated at 97 is provided for adjusting the position of the screw supporting block 86 so as to bring the bevel gear 87 into proper mesh with the complementary gear 88. Shim means 94 is provided for adjusting the relative position of the latter gear with the bevel gear 87. The arrangement of the follow-up mechanism is such, that when the rack bar 59 is actuated to cause a braking of one of the drums and a consequent rotation of the output shaft 17, the screw element 98 is rotated through the gearing connected to the output shaft, and it rotates in such direction as to move the spool 81 in a direction opposite to the moved direction of the bar. The spool is guided in this movement by notches 95 in its flanges, which notches receive a fixed guide plate 96. The latter guides the up and down movement of the spool and prevents rotation thereof.

As the spool moves in a direction opposite to that in which the rack bar was moved, it causes the crank lever 83 and brake shaft 44 to turn in reverse and gradually relax the braking action on the affected drum until a balanced situation is reached that will bring the output shaft 17 to a stop. So, in the assumed case where the rack bar was elevated, the spool will be lowered as the output shaft rotates, and the latter will be brought to a stop by the follower mechanism as the connected aileron reaches its intended position, the intended position being set by the extent of movement of the pointer 53 from neutral position.

When it is desired to restore the aileron to its neutral position, the pilot will manipulate his stick to turn again the control shaft 48 and pointer 54 to neutral position. This action lowers the actuated sector 57 and rack bar 59 to normal position. The reverse movement of the rack bar obviously will turn the crank lever and crank shaft 44 in a counterclockwise direction causing the brake drum 7 to be braked this time and the output shaft 17 to rotate in a counterclockwise direction. The latter action will restore the aileron and simultaneously rotate the follower screw element 98 to drive the spool 81 in a direction opposed to that in which the rack bar 59 was moved. The latter action will continue until the aileron has restored to neutral and the braking action on the affected drum has been relaxed sufficiently to hold the output shaft stationary.

From the foregoing, it can readily be seen how response of the output shaft to braking action is immediate without time lag and how in like manner control surface response follows stick movement without time lag.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A mechanical control system of the character described comprising in combination, means for continuously operating a drive shaft, a planetary gear system including a sun gear carried on the drive shaft, a pair of orbit drum gears planetarily geared to the sun gear, one of the orbit gears being driven in a clockwise direction and the other in a counterclockwise direction, an output shaft secured to a cage arranged in the planetary system to be rotated in a clockwise direction on braking of one of the orbit gears, in a counterclockwise direction on braking of the other orbit gear and to remain stationary on braking of both orbit gears equally, braking means normally braking both orbit gears equally so as to hold the output shaft stationary, control means for selectively unbalancing the action of the braking means so as to brake one orbit gear and not the other and as a consequence produce a desired directional rotation of the output shaft, and follow-up means operatively connected by the output shaft to the control means and adapted to gradually operate the latter to restore the balanced action of the braking means on both gears as the output shaft rotates.

2. In a system as in claim 1, wherein the braking means includes a braking device associated with each orbit gear drum surface, each device being adapted to impart a braking action on its related drum surface balancing that of the other, and the control means includes a braking shaft common to both braking devices and adapted when turned from a normal position to actuate one of the braking devices to brake its related drum and at the same time actuate the other braking device to release its braking action on the other drum.

3. In a system as in claim 2, wherein the control means further includes a control shaft, means for operating the control shaft, a sector attached to the latter shaft, a bar rack adapted to be moved by the latter and crank means operatively connecting the bar rack to the braking shaft whereby a controlled movement of the bar rack is communicated to the braking shaft.

4. In a control system as in claim 2, wherein the control means further includes a control shaft, means for operating the control shaft, a sector adapted to be moved by the latter, a bar rack adapted to be moved by the sector, the follow-up means includes a screw, gearing engaging the screw with the output shaft, a spool threaded on the screw, the output shaft being adapted to move the spool by means of the screw in a direction opposite to any moved position of the bar rack, a link pivoted at one end to the bar rack, at the other end to the spool and having a crank journaled mediately thereof, the crank operatively connecting the braking shaft to the link, whereby such arrangement a controlled movement of the bar rack by the control shaft and sector is communicated through the crank to actuate the brake shaft to brake one of the orbit gear drums, and the reverse movement of the spool relative to the rack consequent upon rotation of the drive shaft serves to actuate the brake shaft through the crank to relax its braking action on the affected drum.

5. In a control system as in claim 4, wherein a guide for the movement of the spool is provided and the spool includes notches in which the guide is received whereby the spool is limited to only an up and down movement on the screw.

6. In a control system as in claim 4, wherein the control shaft including the sector is mounted in carrier support adjustable in position relative to the bar rack for adjusting the position of the sector with the bar rack.

7. In an entirely mechanical control system, a continuously operating air driven turbine power means, an output drive, reversing drive control mechanism operatively associating the output drive with the power means, the reversing drive control mechanism being adapted to provide either a stationary condition, a direct driving or a reverse driving condition to the output drive, first mechanical means normally controlling the reversing drive control mechanism to provide a stationary condition to the output shaft, other mechanical means selectively controlling through said first mechanical means the reversing drive control mechanism to provide either of the two driving conditions to the output drive for a predetermined amount of rotation thereof, the follow-up means operatively associating the output drive through said other means with the reversing drive control mechanism and arranged to actuate said other means so that the reversing drive control mechanism brings the output drive to a stationary condition upon said predetermined rotation of the output drive.

8. In an actuator mechanical control system comprising in combination means for continuously operating a drive shaft, an output shaft, control means for associating the output shaft with the drive shaft for rotation of the output shaft, follow-up means operatively connecting the output shaft to the control means and so constructed and arranged as to be operable upon rotation of the output shaft to reversely actuate said control means to gradually disassociate the drive shaft from the output shaft, said control means including a planetary system having a sun gear carried by the continuously operating drive shaft, a pair of orbit gears geared in the planetary system to the sun gear, one of the orbit gears being driven in a clockwise direction and the other in a counterclockwise direction, a cage geared in the planetary system to both orbit gears and adapted to rotate in a clockwise direction on locking of one of the orbit gears, in a counterclockwise direction on locking of the other orbit gear and to remain stationary on balancing the opposing movements of both orbit gears against one another, a braking system for providing a balancing drag lock on both orbit gears so as to hold the cage in a stationary position, said output shaft connected to the cage, and means for selectively unbalancing the drag block on the orbit gears so as to lock one or the other orbit gears to provide either a clockwise or counterclockwise rotation to the cage and connected output shaft.

References Cited in the file of this patent
UNITED STATES PATENTS

| | | |
|---|---|---|
| 1,395,668 | Drill | Nov. 1, 1921 |
| 2,923,995 | Nock | Aug. 22, 1933 |
| 2,517,680 | Knowler et al. | Aug. 8, 1950 |
| 2,635,836 | Summers | Apr. 21, 1953 |